US012808128B2

(12) United States Patent
Porter

(10) Patent No.: US 12,808,128 B2
(45) Date of Patent: Nov. 24, 2026

(54) EXTRUDED PVC GLASS FIBER REINFORCED RAILROAD TIE WITH ENHANCED THERMAL AND MECHANICAL STABILITY

(71) Applicant: Mark A Porter, Jacksonville, FL (US)

(72) Inventor: Mark A Porter, Jacksonville, FL (US)

( * ) Notice: Subject to any disclaimer, the term of this patent is extended or adjusted under 35 U.S.C. 154(b) by 312 days.

(21) Appl. No.: 18/783,761

(22) Filed: Jul. 25, 2024

(65) Prior Publication Data

US 2026/0028781 A1 Jan. 29, 2026

(51) Int. Cl.

| | |
|---|---|
| ***E01B 3/46*** | (2006.01) |
| ***B29C 48/00*** | (2019.01) |
| ***E01B 3/10*** | (2006.01) |
| ***E01B 3/18*** | (2006.01) |
| ***E01B 3/44*** | (2006.01) |
| ***E01B 9/02*** | (2006.01) |
| ***E01B 9/40*** | (2006.01) |
| ***E01B 13/00*** | (2006.01) |
| *B29K 27/06* | (2006.01) |
| *B29K 309/08* | (2006.01) |

(52) U.S. Cl.

CPC .............. *E01B 3/46* (2013.01); *B29C 48/022* (2019.02); *E01B 3/10* (2013.01); *E01B 3/18* (2013.01); *E01B 3/44* (2013.01); *E01B 9/02* (2013.01); *E01B 9/40* (2013.01); *E01B 13/00* (2013.01); *B29K 2027/06* (2013.01); *B29K 2309/08* (2013.01)

(58) Field of Classification Search

CPC ... E01B 3/44; E01B 3/46; E01B 13/00; E01B 3/10; E01B 3/18; E01B 3/00; E01B 9/02; E01B 9/40; B29C 48/022; B29K 2027/06; B29K 2309/08

See application file for complete search history.

(56) References Cited

U.S. PATENT DOCUMENTS 935,243 A * 9/1909 Baker ........................ E01B 3/18 238/351
997,893 A * 7/1911 Beach ........................ E01B 3/18 238/38

(Continued)

FOREIGN PATENT DOCUMENTS

CN 110541330 B * 2/2021 ............. E01B 13/00
DE 102011117760 A1 * 5/2013 .............. C08J 5/043

(Continued)

*Primary Examiner* — Cheng Lin
(74) *Attorney, Agent, or Firm* — Mark Young, PA

(57) ABSTRACT

An extruded PVC railroad tie with glass fiber reinforcement contains glass fibers and clumps of pelletized glass fibers that enhance friction of all surfaces that are not coated with a cap stock. Parallel spaced apart interior walls enhance structural integrity. Two interior walls provide structures for threaded channels to threadedly and frictionally engage bolts for securing rail connection hardware. Interior compartments provide empty space for air and ballast. Air in the compartments moderates thermal expansion. A protective cap stock covers one or more sides, such as the exterior top and side surfaces of the tie. The bottom surface, which may be substantially devoid of a cap stock, exhibits roughness to grip and frictionally engage underlying ballast.

20 Claims, 8 Drawing Sheets

(56) References Cited

U.S. PATENT DOCUMENTS

| | | | | | |
|---|---|---|---|---|---|
| 3,355,534 | A * | 11/1967 | Groff | B29C 39/00 264/273 |
| 5,891,541 | A * | 4/1999 | Wynne | B29C 70/543 428/105 |
| 12,434,448 | B2 * | 10/2025 | Porter | B29C 48/04 |
| 2023/0175207 | A1 * | 6/2023 | Helberg | E01B 3/46 238/72 |
| 2023/0228041 | A1 * | 7/2023 | Longa Nose | E01B 3/46 238/59 |

FOREIGN PATENT DOCUMENTS

| | | | | |
|---|---|---|---|---|
| DE | 102017207746 | A1 * | 11/2018 | E01B 3/44 |
| EP | 2995436 | B1 * | 2/2017 | B29C 48/919 |
| GB | 2582779 | A * | 10/2020 | E01B 3/46 |
| WO | WO-2015043689 | A1 * | 5/2015 | E02D 5/14 |
| WO | WO-2021243431 | A1 * | 12/2021 | E01B 3/44 |

* cited by examiner

EXTRUDED PVC GLASS FIBER REINFORCED RAILROAD TIE WITH ENHANCED THERMAL AND MECHANICAL STABILITY

FIELD OF THE INVENTION

This invention relates generally to railroad ties, and, more particularly, to an extruded polyvinyl chloride (PVC) glass fiber reinforced railroad tie with enhanced thermal and mechanical stability.

BACKGROUND OF THE INVENTION

Wood cross ties, also known as sleepers, have been commonly used in railroad track construction for over a century. While they have certain advantages, they come with a set of problems that have led to the exploration of alternative materials.

One problem is a limited lifespan. Being a natural material, wood degrades over time. Exposure to weather conditions, such as rain, snow, and temperature variations, can lead to rotting, warping, and splitting of the ties. Wood is susceptible to attack by pests like termites and fungi, which can accelerate the decay process. These organisms can weaken the structural integrity of the cross ties, leading to potential safety hazards and the need for premature replacements. This limits their lifespan and necessitates frequent replacement, resulting in increased maintenance costs.

A related problem is high maintenance requirements. Wood cross ties require regular inspection and maintenance to identify and replace damaged or worn-out ties. This process can be time-consuming and labor-intensive, especially for large railway networks. Frequent maintenance also leads to disruptions in train services, causing delays and inconveniences to passengers and freight transport.

Wood ties also create environmental concerns. The production of wood cross ties involves harvesting and processing timber, which can have environmental implications. Deforestation and habitat destruction can result from the extraction of large quantities of timber for tie production. Additionally, the use of certain wood preservatives, such as creosote, to prolong the life of ties can have negative environmental impacts.

Another problem is inconsistent quality. Wood cross ties exhibit variability in terms of quality due to differences in wood species, treatment methods, and manufacturing processes. This variability can lead to variations in performance and durability, making it challenging to ensure consistent track quality and reliability.

Another related problem is track instability and maintenance. Wood ties may shift or deteriorate over time, affecting track stability. Regular maintenance is required to maintain proper alignment, gauge, and track geometry. Failure to address these issues can result in catastrophic derailments and accidents.

Spikes are commonly used in railroad track construction to secure rails to the cross ties. Over time, spikes can loosen due to various factors such as forces and vibrations from passing trains, thermal expansion and contraction, and rail movement. When spikes become loose, they can compromise the stability of the cross ties, leading to track misalignment and potential safety hazards. When it becomes necessary to replace cross ties, removing spikes from the old ties can be challenging. The spikes are driven deep into the ties and can be difficult to extract without causing damage. This can prolong the process of tie replacement and add complexity to track maintenance tasks.

To address these problems, alternative materials, such as concrete and composite materials, have been developed and increasingly adopted in modern railroad track construction. These alternatives offer improved durability, reduced maintenance requirements, and enhanced track stability compared to traditional wood cross ties.

Plastic cross ties, also known as composite or synthetic ties, have gained attention as an alternative to traditional wood ties in railroad track construction. They offer several advantages, but also present some challenges. Prior plastic cross ties have been considerably more expensive upfront compared to wood ties. Although they have a longer lifespan and reduced maintenance requirements, the initial investment has been a deterrent for some railway operators. Additionally, prior plastic cross ties have been heavy and difficult to handle. In many cases they are solid molded structures with an overall weight that may exceed that of a wood tie. Plastic materials also have a higher coefficient of thermal expansion compared to wood. This means they are more prone to expanding and contracting with temperature changes. If not accounted for properly during installation, thermal expansion can lead to track misalignment and potential issues with track stability.

What is needed is a plastic tie that has good thermal and mechanical stability, a much longer lifespan than wood ties, is resistant to rot, insect infestation, and moisture absorption, and results in reduced maintenance costs and fewer disruptions to train services. The plastic tie should enable use of fasteners superior to conventional spikes. The plastic tie should be manufactured with precise specifications, resulting in consistent quality and performance, ensuring uniformity and reliability in track construction, leading to improved track stability and reduced maintenance requirements. Preferably, the plastic tie is lighter, or not heavier, than a comparable wood tie, making it easy to handle during installation and maintenance. Also, preferably the plastic tie is be made from recycled materials, reducing the demand for virgin resources and reducing overall environmental impact compared to wood ties.

The invention is directed to overcoming one or more of the problems and solving one or more of the needs as set forth above.

SUMMARY OF THE INVENTION

To solve one or more of the problems set forth above, in an exemplary implementation of the invention, an extruded PVC railroad tie with glass fiber reinforcement is provided. Glass fibers and clumps of pelletized glass fibers enhance friction of all surfaces that are not coated with a cap stock. Parallel spaced apart interior walls (e.g., 3 walls) enhance structural integrity. Two interior walls provide a structure for threaded channels to threadedly engage bolts used to secure rail connection hardware. Glass fibers are palpable at the surfaces that define the bolt holes. Palpable means extending to the surface, thereby being perceptible by touch. In the case of the glass fibers, i.e., separated strands and/or clumps of pelletized glass fibers, glass fibers extend to the surface, thereby being perceptible by touch and increasing friction at the surface.

Compartments between interior walls and between interior sides of side walls and interior walls provide empty space for air and ballast. Air in the compartments moderates thermal expansion. A cap stock covers the exterior top and side surfaces of the tie. The bottom surface, without a cap stock covering, remains rough to grip and frictionally engages underlying ballast.

An extruded railroad tie is a hollow rectangular prism structure with an interior space, a top wall, a bottom wall and a pair of spaced apart side walls. The hollow rectangular prism includes parallel spaced apart interior walls. Each interior wall extends from the top wall to the bottom wall and is coterminous with the hollow rectangular prism, i.e., extends the entire length of the hollow rectangular prism. The interior walls may include an intermediate wall disposed between a first interior wall and a second interior wall. Interior compartments defined between the side walls and interior walls may receive ballast, provide cooling passages.

The hollow rectangular prism is made from extruded PVC with glass fiber reinforcement. The glass fiber reinforcement includes separated glass fibers and clumps of pelletized glass fibers. At least some of the separated glass fibers and clumps of pelletized glass fibers are palpable at an exterior surface of the bottom wall, and at interior surfaces of the top wall, bottom wall and plurality of parallel spaced apart interior walls, and in bolt holes. The palpable glass fibers and clumps of pelletized glass fibers produce a roughened surface, i.e., a prickly and/or bumpy surface. Such a surface provides superior frictional engagement between the tie and underlying ballast and between the tie and an engaged bolt. Such engagement helps stabilize the tie and reduces risk of loosening hardware.

In one embodiment, a capstock is co-extruded on an exterior surface of the top wall and on exterior surfaces of the pair of spaced apart side walls. In one embodiment, a capstock is not co-extruded on an exterior surface of the bottom wall. A textured surface, such as a knurled surface, a surface with debossed features, or an embossed surface may be provided in the capstock co-extruded on the exterior surface of the top wall, and optionally the exterior surfaces of the side walls.

A plurality of threaded bolt holes extend through the top wall into each of the first interior wall and the second interior wall. The threaded bolt holes extending into the first interior wall are aligned with the threaded bolt holes extending into the second interior wall. Glass fibers are palpable at the surfaces that define the bolt holes. The glass fibers enhance frictional engagement of a bolt, thereby reducing risk of loosening.

A rail plate attaches to an exterior side of the top wall. The rail plate including a first side, a second side opposite the first side, a rail channel disposed between the first side and the second side, and a plurality of mounting holes formed in each of the first side and the second side. The rail plate supports a portion of a rail on the tie. The mounting holes align with the plurality of threaded bolt holes extending into each of the first interior wall and the second interior wall. Bolts extend through the mounting holes in the rail plate and into the threaded bolt holes.

Rail mounting clamps are provided to secure a rail in place in the rail channel. Each mounting clamp includes a first portion overlapping a portion of the rail channel, a second portion opposite the first portion, and a clamp mounting hole between the first portion and the second portion. A bolt extends through each clamp mounting hole, through the mounting hole of the rail plate and into the threaded bolt hole.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

Figure 1:
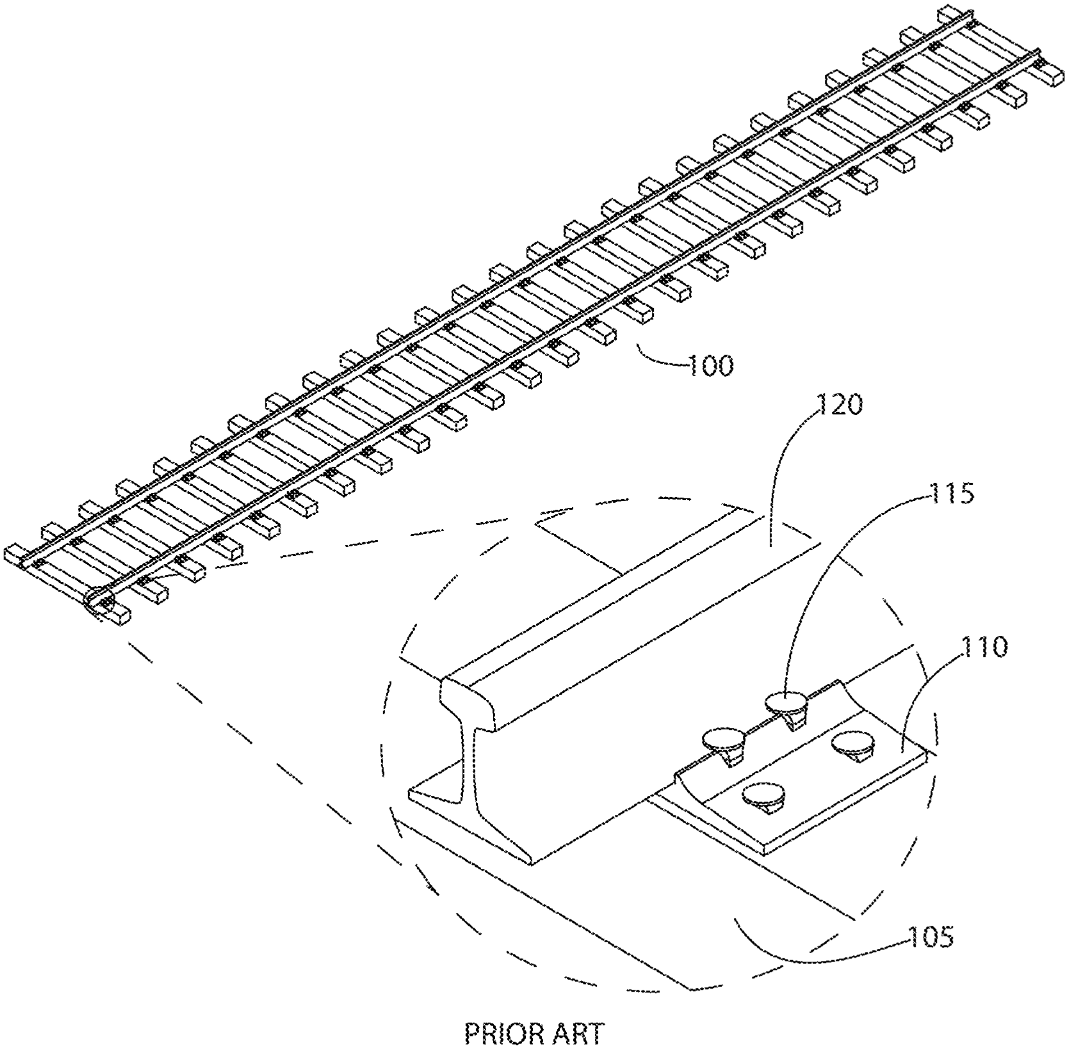
FIG. 1 is a top perspective view of an exemplary prior art railroad track segment.

FIG. 1 conceptually illustrates a prior art conventional railroad track segment 100. Railroad track segment 100 includes several key components. Rails 120 are the long, steel beams that form the primary running surface for the train wheels. They are typically made of high-quality steel and are laid parallel to each other, forming a continuous track. The rails provide a smooth and durable surface on which the train wheels roll.

Wood ties 105 or sleepers, also known as cross ties, are cuboid wood structures that support and hold the rails 120 in place. Ties 105 are positioned perpendicular to the rails 120 and are usually spaced at regular intervals along the track 100. Ties 105 distribute the weight of the rails and trains to underlying ballast and foundation. They also help maintain a proper gauge (the distance between the rails) and provide lateral stability to the tracks.

Ballast (not shown) is a layer of crushed stones or rocks that is laid beneath and around the ties 105. Ballast helps provide stability, load distribution, drainage, and track alignment.

Fasteners are the components that secure the rails 120 to the ties 105, maintaining the proper alignment and preventing movement or displacement caused by train traffic or external forces. In the illustrated embodiment, the fasteners include a rail plate 110 secured with a plurality of spikes 115. Some spikes 115 engage the edge of a rail 120, while other spikes 115 simply secure the rail plate 110 to the tie 105.

Figure 2:
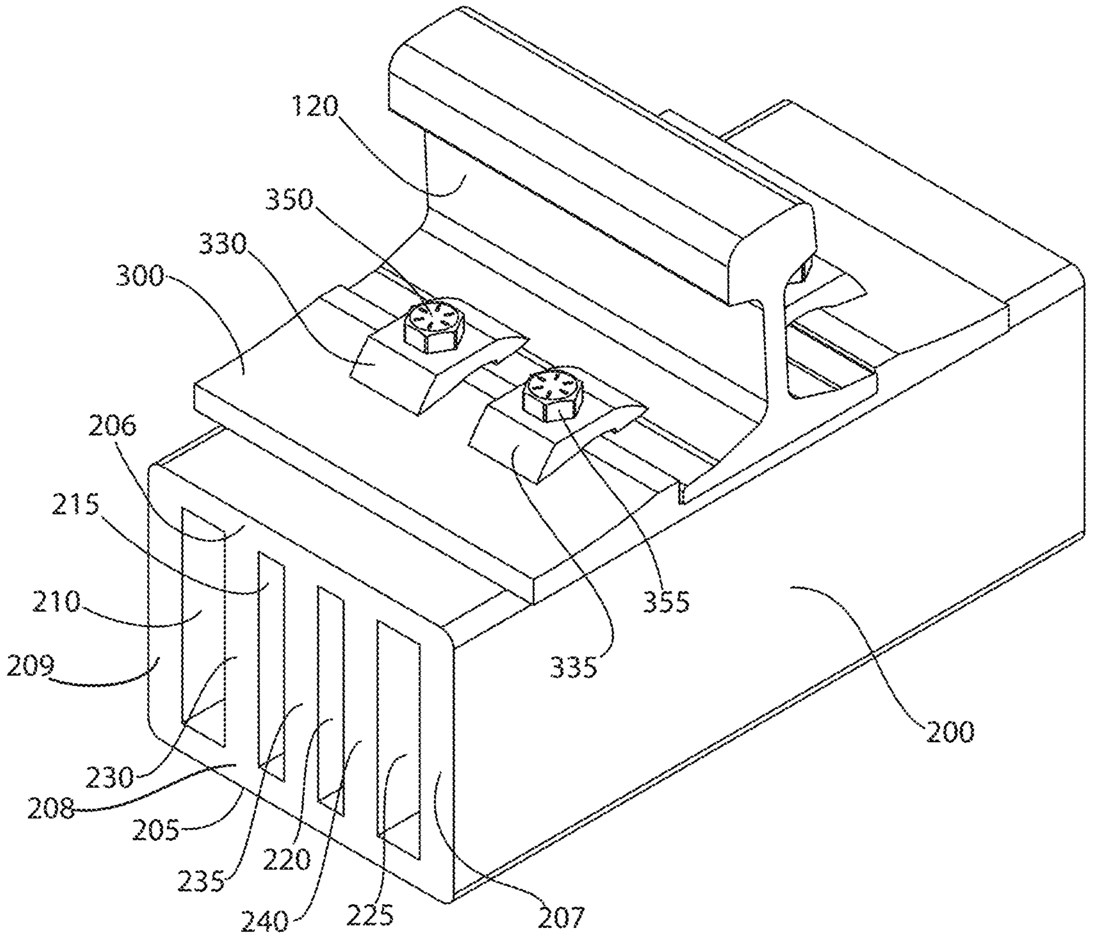
FIG. 2 is a perspective view of a portion of an exemplary extruded railroad tie with a rail plate and portion of a rail secured by clamps and bolts according to principles of the invention.
Figure 3:
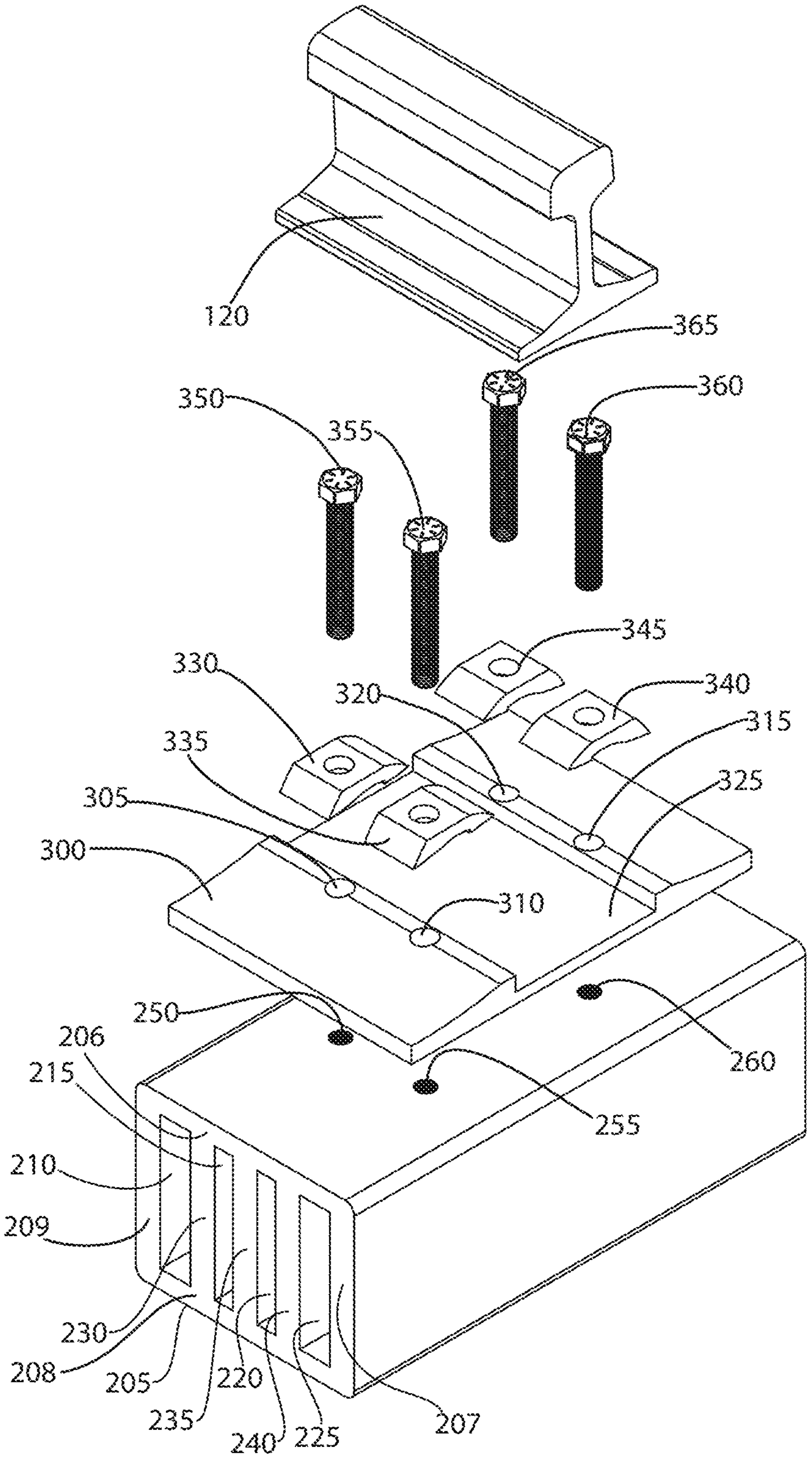
FIG. 3 is a perspective exploded view of a portion of an exemplary extruded railroad tie with a rail plate, portion of a rail, clamps and bolts according to principles of the invention.
Figure 8:
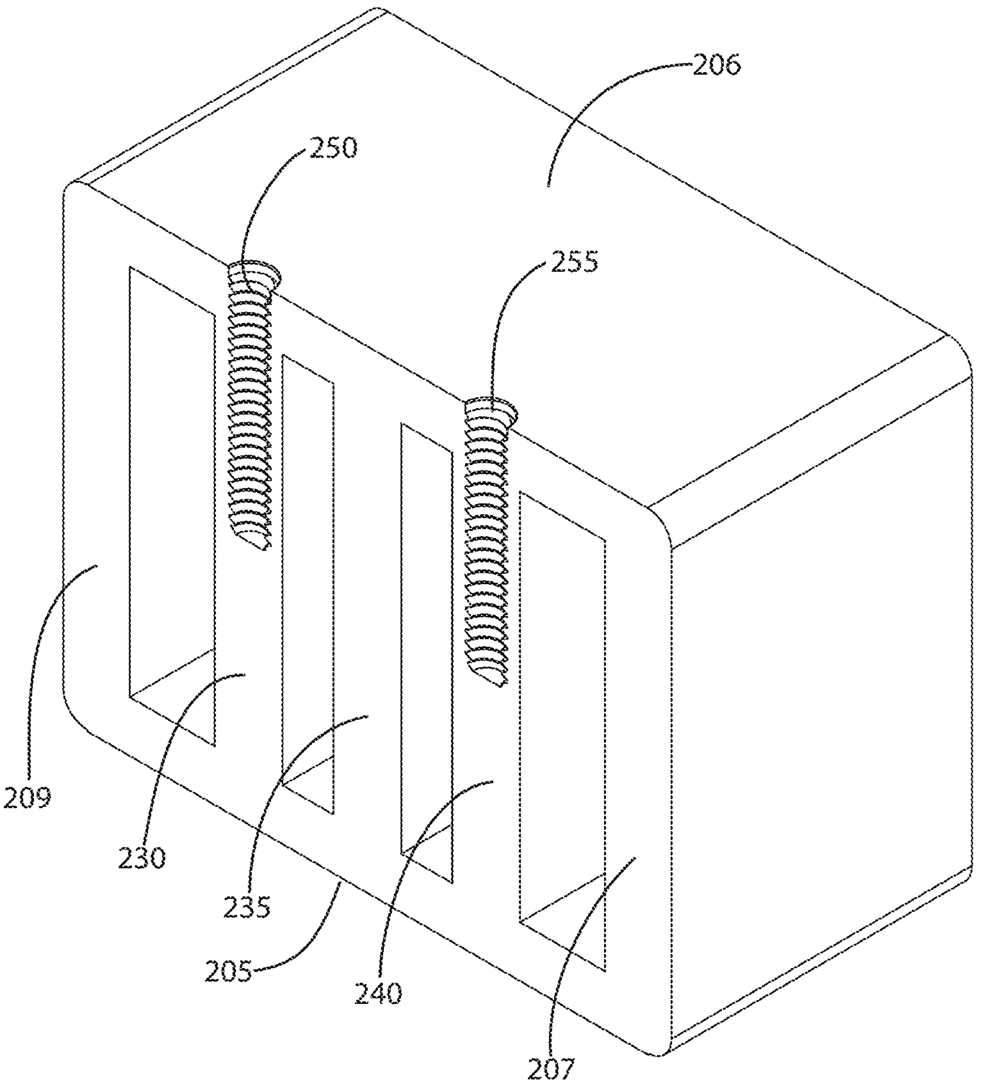
FIG. 8 is a section view that reveals threaded holes in interior walls of an exemplary extruded railroad tie according to principles of the invention.

FIGS. 2 and 3 conceptually illustrate an exemplary portion of an extruded railroad tie 200 with a rail plate 300 and a portion of a rail 120 secured by clamps 330-345 and bolts 350-365 according to principles of the invention. The rail plate 300 includes a channel 325 in which a bottom portion of the rail 120 is received. The width of the channel 325 is about equal to or slightly greater than the width of the bottom of the rail 120. Clamps 330-345 align with holes 305-320 through the rail plate 300, which align with threaded holes (bolt holes) 250-265 (FIGS. 3 and 4) in the extruded tie 200. The threaded holes 250-265 extend through the top wall 206 into the interior walls 230, 240, as shown in FIG. 8. Glass fibers are palpable at the surfaces that define the threaded holes 250-265. The glass fibers enhance frictional engagement of a bolt, thereby reducing risk of loosening. Unlike spikes used with conventional railroad ties, bolts 350-365 threadedly engaged in threaded holes 250-265 will not loosen with vibration of the rail.

Each clamp 330-345 overlaps a portion of the bottom flange of the rail 120 while also overlapping a portion of the rail plate 300. Bolts 350-365 extend through holes in the clamps 330-345, through holes 305-320 in the rail plate 300 aligned with holes in the clamps, and into threaded holes 250-265 in the extruded tie 200, which are aligned with the holes 305-320 in the rail plate 300. The bolts 350-365 threadedly engage the threaded holes 250-265 in the extruded tie 200. The bolts 350-365 secure the clamps 330-345 against engaged portions of the rail plate 300 and rail 120.

Each side of a tie 200 includes threaded holes 250-265 and 270-285 (FIG. 4) for mounting a rail plate 300 with clamps 330-345 and mounting bolts 350-365. The holes 250-265 and 270-285 are sized spaced and located for attaching a rail plate 300. A plurality of ties 200 and fastening hardware according to principles of the invention secure two parallel rails at proper gauge, which comprise a track.

Figure 4:
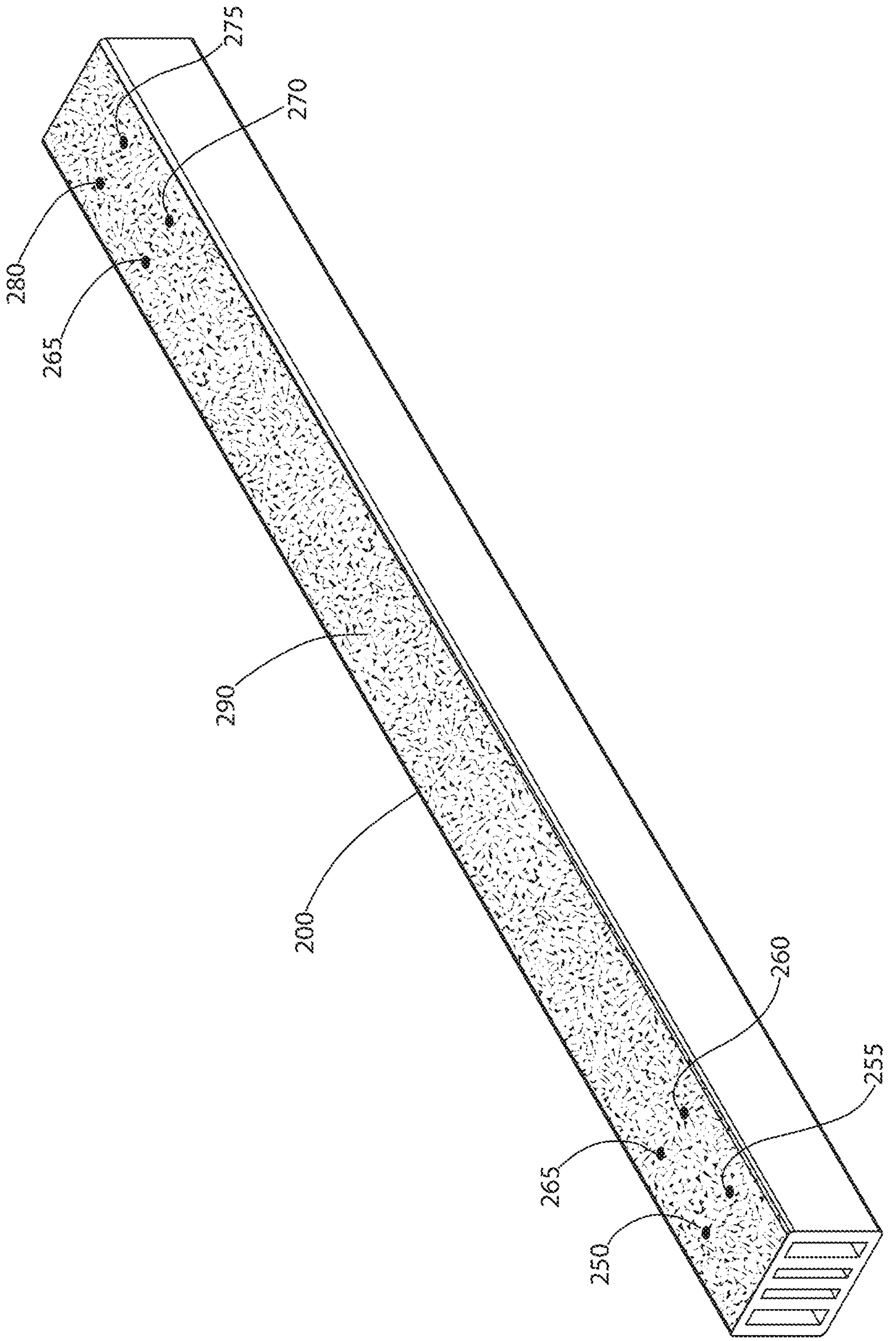
FIG. 4 is a perspective view of an exemplary extruded railroad tie according to principles of the invention.

One or more surfaces of the tie 200 may be textured (e.g., knurled, debossed and/or embossed). By way of example and not limitation, a top surface 290 (and/or side surfaces and/or a bottom surface) may be textured, e.g., include ridges and/or indentations to aid traction and grip. All sides or fewer than all sides may be heavily debossed or embossed with patterns to enhance grip in the ballast and provide a non-slip surface for walking. Such knurls, debossed features and embossments, i.e., texturing, may be added after extrusion by running the extrudate (i.e., the material and structure that has been extruded) past a roller for each side to be textured. Each roller is textured to form ridges and/or indentations in the surface to aid traction and grip. Each roller may be heated. Sufficient pressure is applied to indelibly impress the texture into the surface of the tie. The resulting texture is three-dimensional, including palpable, undulations, valleys, dimples, ridges, indentations or other structures that aid traction and grip. While FIG. 4 illustrates one textured surface, other surfaces (e.g., side surfaces and the bottom surface) may be similarly textured without departing from the scope of the invention. Texturing the bottom surface may improved traction with underlying ballast. Textured surfaces engage ballast better than smooth surfaces. Traction and grip enhances stability and facilitates maintenance. Workers may walk upon a textured tie 200 surface without slipping.

In an exemplary embodiment, the tie 200 is comprised of an extruded rigid thermoplastic, e.g., polyvinylchloride (PVC), with glass fiber reinforcement. PVC is advantageous because it is relatively inexpensive, resistant to environmental degradation (as well as to chemicals and alkalies), exhibits high hardness for a plastic and outstanding tensile strength for a plastic. PVC is also widely available, commonly used, easily recyclable and readily available as a recycled material. However, the invention is not limited to PVC. Other extrudable thermoplastics, such as, but not limited to, acrylonitrile butadiene styrene (ABS), polyoxymethylene (POM), and polyolefins, such as, but not limited to, polyethylene (e.g., high density polyethylene) and polypropylene, may be used within the spirit and scope of the invention.

The thermoplastic material without fiber reinforcement is the matrix. The extent that strength and rigidity are enhanced in the fiber-reinforced plastic depends on the mechanical properties of both the fiber and matrix, their volume relative to one another, and the fiber length and orientation within the matrix. In the exemplary embodiment, the fibers assume orientations achieved during the extrusion process. Examination has shown that, upon extrusion, the fibers are oriented in various directions, some aligned with the direction of flow, and some not aligned with the direction of flow. This "random" orientation is considered advantageous because it provides structural enhancement in all directions.

PVC has a very high viscosity in the processing range. The high viscosity complicates processing with added reinforcing fibers. To improve processing, additives may be introduced into the mix. An exemplary PVC matrix may be a commercially available, free flowing, granular powder. Additives, such as one or more plasticizers, such as, but not limited to, dioctyl terephthalate (DOTP), may be used to decrease the viscosity of the mix and to improve flexibility and durability.

Another additive, a lubricant may be used to reduce friction between the processing machinery and the plastic materials, between the molecules of the plastic materials and between the molecules of the plastic materials and the fiber reinforcements. The lower the friction, the better the processing properties of the underlying plastic. ORC-A (calcium acetylacetante) is one nonlimiting example of a lubricant.

Another additive, a heat stabilizer, may be used to greatly increase the heat stability of PVC, such as scavenging of HCl molecules released during processing. Without a heat stabilizer, when PVC is exposed to heat (>100 °C), HCl is eliminated from the polymer backbone, which triggers a further autocatalytic degradation process, causing rapid discoloration and embrittlement of the PVC. A nonlimiting example of a heat stabilizer is barium-zinc, calcium-zinc or aluminum magnesium carbonate hydroxide (hydrate) additive.

Another additive, an impact modifier, may be used to improve durability and toughness. In addition to the impact performance, a number of other characteristics such as tensile properties, weatherability, processability, flammability, and heat distortion can be improved by adding an impact modifier. A nonlimiting example of an impact modifier is precipitated calcium carbonate (PCC).

As a reinforcement and friction enhancer, chopped strand fibers, i.e., glass fibers, are added. The fibers generally contain oxides of silicon, calcium, aluminum, magnesium and/or boron. By way of example and not limitation, the fibers may comprise E-glass, which is alumino-borosilicate glass with less than 1% (by weight) alkali oxides. The fibers are small diameter (e.g., about 5 to 18 μm) strands, each having a short length (e.g., about 0.125 to 0.50 inch).

In a preferred embodiment, pelletized glass fibers are used. Each pellet, about the size of a grain of rice, is a clump of individual short strands of glass fibers. These pelletized clumps of fibers in the extrudate contribute to bumpiness of the extruded product. The bumps are perceptible and palpable. During extrusion, some pellets remain fully or partially intact as clumps while others are broken apart with the clumps becoming separate strands. Many strands extend to the surfaces of the interior walls. Portions of such strands contained in the extruded plastic are palpable at the wall surface. The surfaces of the walls that are not covered with a cap stock, such as, for example, interior walls and the bottom surface, feel rough to the touch, because portions of the fibers (e.g., fiber ends) reach the surfaces of the walls. Such strands impart a rough, slightly furry or prickly texture to the interior wall surfaces. The bumpiness from the fully or partially intact pellets and roughness from the separated strands provide enhanced friction, i.e., enhanced skin friction. The coefficient of friction (determined in accordance with ASTM D1894-14) and the enhanced skin friction equal or exceeds the friction coefficient and skin friction of a comparably sized wood tie 200.

Timber ties are often comprised of oak, southern yellow pine or douglas fir. Such wood ties may exhibit average surface roughness Ra in the range of 2.5 to 4.0 μm. The average surface roughness of the interior surfaces of a tie 200 according to principles of the invention may equal or exceed the average wood surface roughness.

The glass fibers comprise a substantial portion of the mix to be extruded. The glass fibers comprise approximately 20-50% (by weight) of the extruded material (excluding the co-extruded cap stock). In a particular exemplary embodiment, the glass fibers comprise 30% (by weight) of the extruded material (excluding the co-extruded cap stock).

The ingredients for the mix are introduced into a vessel, before extruding. Then they are mixed. Any mixing apparatus suitable for blending solids may be used. Before extrusion, the mix should be substantially homogeneous. Thus, two samples of equal volumes from different parts of the mix should exhibit the same or closely similar masses, and the same or closely similar concentration of each ingredient (e.g., PVC, each additive and reinforcing fibers).

In an exemplary implementation, to produce a tie 200 according to principles of the invention, a hollow cuboid structure with parallel, spaced apart coextensive internal reinforcing walls is extruded. A protective outer layer is coextruded on or more exterior surfaces of the cuboid structure. The tie 200 may be cut to a desired length.

Unplasticized PVC (PVC-U) is hard and brittle. An important characteristic of PVC is the glass transition temperature, Tg, which describes the significant change of a hard and stiff material behavior to a tough and soft one. This temperature is not a sharp point but a temperature range. For PVC-U the glass transition is at about 80 °C, 176 °F. However, by adding plasticizers, the stiffness and the glass transition temperature can be reduced significantly.

A PVC tie 200 may experience a substantial reduction in rigidity if stored outdoors in a hot climate. Infrared radiation from the sun will heat the tie 200. If the tie 200 is stored horizontally, heat may collect within the tie 200. Over time, the temperature of the tie 200 may approach or even exceed the glass transition temperature, especially if the tie 200 includes plasticizer and is stored on blacktop.

The outer layer may incorporate PVC, colorants, one or more IR and UV inhibitors, and impact modifiers. Titanium dioxide, zinc dioxide and other infrared reflecting pigments are highly effective for inhibiting degradation from infrared radiation. Such additives provide a cooling effect via reflection, which helps keep the tie 200 below the glass transition temperature. The outer layer, which is devoid of glass fibers, prevents spalling from the inner layer containing glass fibers. The outer layer may also include a relatively high concentration of impact modifiers to reduce brittleness, while shielding the inner layer from degradation that may otherwise increase its brittleness.

The tie 200 is relatively lightweight. Its interior includes empty spaces in the form of compartments. It can be maneuvered with the same equipment used for wood ties. It can be drilled using ordinary drill bits suitable for drilling wood. It can be cut using ordinary saw blades suitable for cutting wood. It will not leach toxic chemicals. It will not be susceptible to attack by wood-destroying microorganisms. It possesses structural properties (e.g., compressive strength and modulus of elasticity) that are sufficient for use as a structural tie 200. Depending upon the particular formulation, the structural properties will at least equal or exceed those for conventional wood ties.

Advantageously, a tie 200 according to principles of the invention is impervious or highly resistant to insects and wood destroying organisms, does not contain toxic chemicals that may leach into the ground and water, is relatively easy to lift using the same equipment used to lift wooden ties, and is capable of being cut, nailed and screwed using conventional hand tools and hardware for wood construction.

In one embodiment, as illustrated in FIGS. 2 and 3, rail mounting hardware such as a rail plate 300 and a rail 120 are secured to the tie 200 by threading bolts 350-365 through clamps 330-345 through holes in the rail plate 300 on each side of the tie 200 and into threaded channels 250-265 and 270-285 in the tie 200.

The threaded channels 250-265 and 270-285 may be formed directly in the tie 200 using a tap. The tap size should match the desired diameter, thread size and pitch. After a hole is drilled to a desired depth, the tap is placed in the hole, ensuring that it is straight and properly aligned with the hole. A tap guide or starting taper may be used to help ensure a straight entry. Gentle downward pressure is applied while turning the tap clockwise (right-hand threads) or counterclockwise (left-hand threads). The tap cuts and forms threads along the walls of the hole. Periodically the tap may be reversed to break and clear any chips. This helps prevent clogging and ensures proper cutting. A depth stop may be used or the depth measured using a depth gauge to achieve consistent thread depth across the multiple channels. In one embodiment, the interior walls 230, 240 into which the threaded channels 250-265 and 270-285 extend have thicknesses that are at least ⅛ or ¼ inch greater than the channel diameter. Thus, for example, one inch thick walls 230, 240 may be used with ¾-inch threaded channels 250-265 and 270-285.

Glass fibers, e.g., separated strands and/or clumps of pelletized glass fibers, extend to the interior surfaces of the threaded channels 250-265 and 270-285. The glass fibers are palpable at the surfaces. The glass fibers produce a roughened surface, i.e., a prickly and/or bumpy surface. Such a surface provides superior frictional engagement between the tie and an engaged bolt. The friction prevents loosening of bolts under the influence of vibrations.

Figure 6:
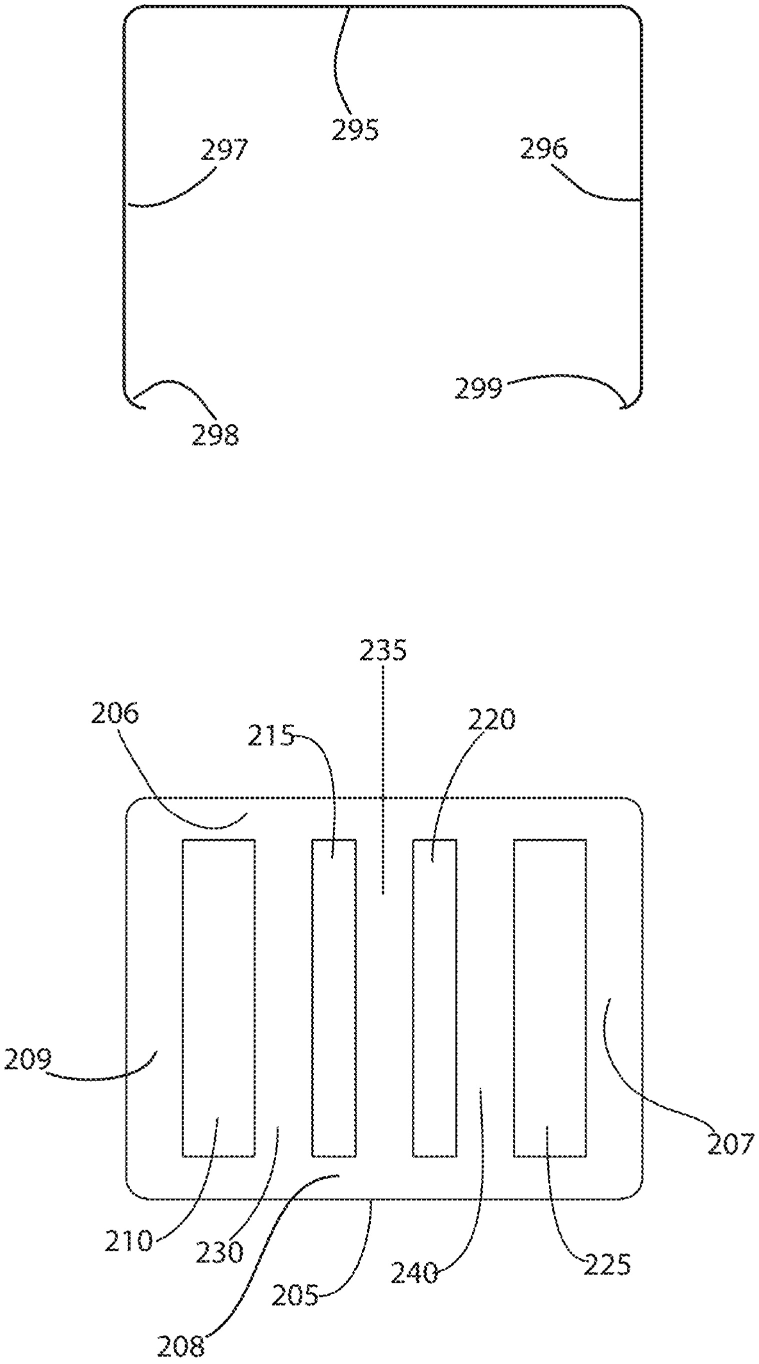
FIG. 6 is a profile exploded view of an exemplary extruded railroad tie and cap stock according to principles of the invention.

With reference to FIGS. 2, 3 and 6, the exemplary tie 200 is an extruded hollow beam 205 with a rectangular cross section, i.e., a hollow rectangular prism. The interior space is divided (e.g., evenly divided) by three parallel spaced apart interior walls 230, 235, 240 (235-240). The interior walls 230-240 are parallel to each other. The interior walls 230-240 are perpendicular to the walls they intersect, namely, the top wall 206 and bottom wall 208. The interior walls 230-240 are parallel to the side walls 207, 209. The interior walls 230-240 are coextensive with (i.e., coextensive in length with) the beam 205. Thus, the interior walls 230-240 run coextensive with the beam's 205 entire length. The interior walls 230-240 extend from a top wall 206 of the beam 205 to a bottom wall 208 of the beam 205. The top wall 206 is the wall that engages rail mounting hardware. The bottom wall 208 is opposite the top wall 206. One interior wall 235 (i.e., the middle interior wall 235) is in the middle of the beam. The other two interior walls 230, 240 (i.e., the intermediate interior walls 230, 240) are equally spaced from the middle interior wall 235, but on opposite sides of the middle interior wall 235. Thus the space between the middle interior wall 235 and one intermediate interior wall 230 is equal to the space between the middle interior wall 235 and the other intermediate interior wall 240. These interior walls 230-240 divide the interior space into four chambers 210, 215, 220, 225 (210-225) or compartments. This structure provides high strength and stiffness with reduced weight as compared to a solid beam of similar composition. It strikes a balance between structural integrity and weight. As material cost and weight are related, it also strikes a balance between structural integrity and cost.

The interior compartments 210-225 may receive some ballast. The open ends of the tie 200 may be partially, substantially or almost entirely covered with ballast. Even if the compartments 210-225 are substantially filled with ballast, there will remain many empty spaces between the ballast. Thus, the compartments 210-225 contain air that is mostly if not entirely shielded from the sun and wind. The contained air moderates the temperature of the tie 200, thereby reducing expansion and contraction of the tie due to ambient thermal conditions.

The compartments may also be used to house and protect sensors and transmitters. Such sensors and transmitters may detect faults (e.g., a rail disengagement or pitching, rolling or yawing of the tie) and communicate fault signals to a remote receiver.

Figure 5:
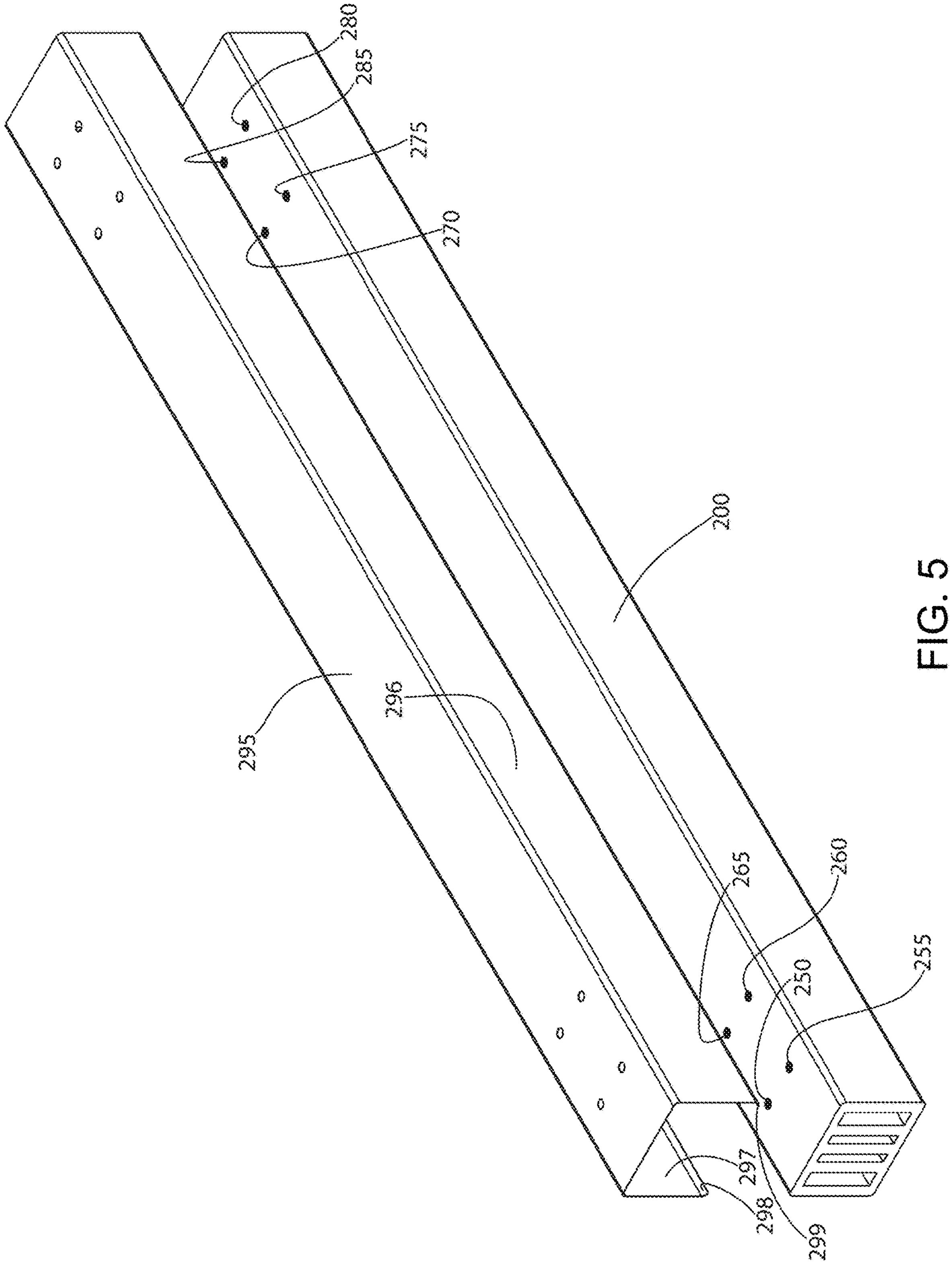
FIG. 5 is a perspective exploded view of an exemplary extruded railroad tie and cap stock according to principles of the invention.

A cap stock is coextruded onto at least one exterior surface (i.e., the exterior surface of the top wall 206) of the beam 205, and, in one embodiment, on at least 3 exterior surfaces (i.e., the exterior surfaces of the top 206 and side 207, 209 walls) of the beam 205. As shown in FIGS. 5 and 6, a nonlimiting example of a cap stock includes a top surface 295 cap stock, side surface cap stocks 296, 297, and bottom corners 298, 299 (e.g., fillets-rounded corners). The bottom corners ensure that the entire exterior surfaces of the sides walls 207, 209 are protected with a cap stock. In another embodiment, all exterior surfaces are covered with a cap stock. In yet another embodiment, all exterior and interior surfaces are covered with a cap stock. In yet another embodiment fewer than all exterior and interior surfaces are covered with a cap stock.

In the exemplary embodiment of FIGS. 5 and 6, the exterior surface of the bottom wall 208 is substantially uncovered with a cap stock (i.e., devoid of a cap stock). Excepting the exterior corners between the exterior of the bottom wall 208 and the exterior of the side walls 207, 209, the exterior surface of the bottom wall 208 is devoid of cap stock. This is done for a reason. The exterior surface of the bottom wall 208 will be against the ballast, not exposed directly to sunlight. The exterior surface of the bottom wall 208 is rough, due to the glass fiber strands and clumps of glass fibers contained in the extruded tie 200. The roughness of the bottom surface is desirable to improve grip and traction between the tie 200 and the ballast. Other exterior surfaces that are covered with a cap stock are smooth, except to the extent that they have been textured or knurled as described above. Thus, if 3 out of four surfaces are covered with a cap stock, ¼ less cap stock is used than if all 4 surface were covered with a cap stock. Concomitantly, the uncovered bottom surface is rough, which enhances grip and traction without the need for texturing or knurling.

The cap stock is a protective covering or layer that enhances the durability, aesthetics, and weather resistance of the beam. The cap stock is applied through a co-extrusion process, where the base material and the cap stock material are simultaneously extruded to form a single composite structure. The cap stock covers the protected surfaces for the entire length of the beam 205. The thickness of the cap stock (e.g., thickness of about 0.01 to 0.25 mm or more) can vary depending on the specific application and desired level of protection. It is engineered to be thin yet robust enough to provide UV protection and adequate resistance to impact, scratching, fading, and other forms of wear and tear. The cap stock may enhance the appearance of the extruded beam 205. The cap stock imparts several performance benefits to the extruded beam 205. It provides enhanced protection against moisture, UV radiation, chemicals, and abrasion. It also improves the beam's resistance to fading, chalking, and discoloration caused by prolonged exposure to sunlight and harsh weather conditions. The cap stock reduces the maintenance requirements of the beam. It typically requires minimal cleaning and upkeep, as it resists staining, corrosion, and the growth of mold or mildew. This makes the extruded tie 200 with a cap stock a long-lasting and low-maintenance solution.

A nonlimiting example of an exemplary cap stock includes a base material such as PVC (Polyvinyl Chloride), which is the base material of the extruded beam 205. PVC offers good durability, chemical resistance, and dimensional stability. It provides a solid foundation for the cap stock while ensuring compatibility with the PVC beam. UV stabilizers are added to protect against the damaging effects of UV radiation. These stabilizers help prevent the degradation of the cap stock and PVC beam caused by prolonged exposure to sunlight. Common types of UV stabilizers include hindered amine light stabilizers (HALS) and UV absorbers. Impact modifiers are incorporated into the cap stock formulation to enhance its impact resistance. These additives improve the cap stock's ability to withstand sudden impacts, reducing the risk of cracking or fracturing. Common impact modifiers for PVC cap stocks include acrylic impact modifiers, chlorinated polyethylene (CPE), or butadiene-based modifiers. To enhance the cap stock's resistance to abrasion, specific additives are included in the composition. These additives improve the cap stock's durability and ability to withstand wear caused by friction or contact with abrasive surfaces. Examples of abrasion resistance additives include acrylics, styrene-butadiene rubber (SBR), or certain plasticizers. Plasticizers are added to improve the flexibility and workability of the cap stock material. They help maintain the cap stock's desired mechanical properties, such as elongation and tensile strength, even in challenging conditions. Common plasticizers for PVC-based cap stocks include phthalates or alternative non-phthalate plasticizers. Colorants (e.g., pigments or dyes) may be added to the cap stock formulation to provide a desired color or appearance.

Figure 7:
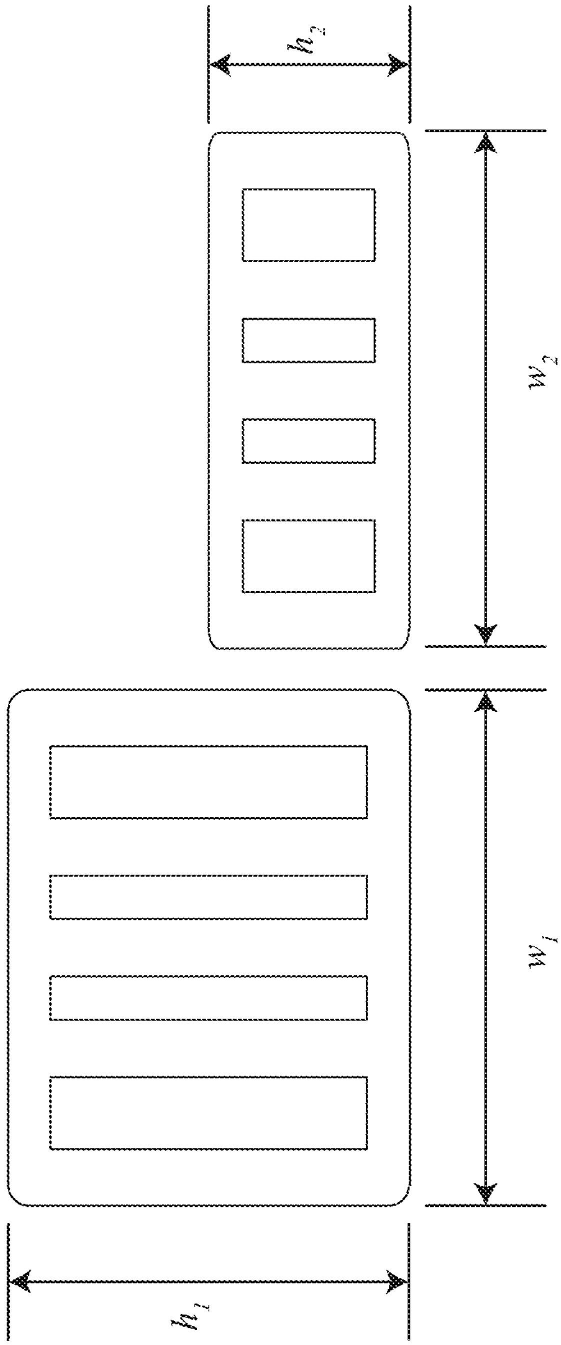
FIG. 7 is a profile that compares a 9"×7" embodiment and a 5"×7" embodiment of an exemplary extruded railroad tie according to principles of the invention.

The dimensions of the railroad tie 200 can vary depending on the specific country or region and application. In North America, standard railroad ties typically have a length of approximately 8 feet 6 inches to 9 feet 6 inches (2.6 to 2.9 meters). The width $w_1$, $w_2$ (FIG. 7) is approximately 9 inches (22.9 centimeters). The height $h_1$ is approximately 7 inches (17.8 centimeters). However, a lower height $h_2$ of about 40 to 60% of the standard height $h_1$ may be used to reduce material and achieve structural enhancement. Reducing the height (length) of the internal and side walls increases the walls' resistance to buckling. In Europe, the length is approximately 8 feet 6 inches to 8 feet 9 inches (2.6 to 2.7 meters). The width is approximately 10 inches (25 centimeters). The height is approximately 6 inches (15 centimeters). A tie 200 according to principles of the invention may be produced with these dimensions, thus being sized as a conventional wood tie. Having the same length and width as a wood tie is important to provide the proper track gauge and to accommodate and support the rail mounting hardware (e.g., the rail plate). The height (measured from the exterior surfaces of the exterior surface of the top wall 206 to the exterior surface of the bottom wall 208) may be varied (e.g., decreased) to further reduce cost and weight, without compromising utility of the tie 200, provided that the height remains sufficient to provide threaded channels 250-265 and 270-285 with sufficient depth to receive mounting bolts 350-365.

In the exemplary tie, each wall 206-209 and 230-240 has a width (thickness) of at least about 1 inch, plus any cap stock thickness. The width of each side compartment 210, 225 is approximately 0.75 to 1.75 inches, preferably about 1.25 inches. The width of each central compartment 215, 220 is about 0.5 to 1 inches, preferably about 0.75 inches. The height of each compartment is about 5 to 6 inches, preferably about 5.5 inches. The width of the tie is about 9 inches, plus the thicknesses of any cap stock layers. The height of the tie is about 7 inches, plus the thickness of any cap stock layer. Thus, at least one third of the total pile 200 volume is empty space. Additionally, each interior wall 230-240 is flanked by (i.e., disposed between) compartments.

Any dimensions, amounts or concentrations are provided as approximations for a particular embodiment, unless expressly stated otherwise. Dimensions may be varied without compromising utility and without departing from the scope of the invention. Varied dimensions, amounts or concentrations that do not substantially impair utility of the invention come within the spirit and scope of the invention. Subject to the foregoing, unless otherwise specified herein, dimensions may be varied by ±5% without departing from the scope of the invention. Thus, except as otherwise stated herein, about equal to means equal to or within ±5% of being equal. Similarly, at least about means as great as or within ±5% of being as great as.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. An extruded railroad tie comprising a hollow rectangular prism including an interior space, a top wall, a bottom wall and a pair of spaced apart side walls, the hollow rectangular prism being comprised of extruded PVC with glass fiber reinforcement, the glass fiber reinforcement including separated glass fibers and clumps of pelletized glass fibers, at least some of the separated glass fibers and clumps of pelletized glass fibers being palpable at an exterior surface of the bottom wall; a plurality of parallel spaced apart interior walls, each interior wall extending from the top wall to the bottom wall and being coterminous with the hollow rectangular prism; the plurality of parallel spaced apart interior walls including a first interior wall and a second interior wall, a plurality of threaded bolt holes extending through the top wall into each of the first interior wall and the second interior wall, at least some glass fibers being palpable in the threaded bolt holes.

2. The extruded railroad tie of claim 1, the plurality of parallel spaced apart interior walls, occupying less than all of the interior space.

3. The extruded railroad tie of claim 2, the plurality of parallel spaced apart interior walls defining a plurality of interior compartments, at least some of the separated glass fibers and clumps of pelletized glass fibers being palpable at interior surfaces of the top wall, bottom wall and plurality of parallel spaced apart interior walls.

4. The extruded railroad tie of claim 2, further comprising a capstock co-extruded on an exterior surface of the top wall and on exterior surfaces of the pair of spaced apart side walls.

5. The extruded railroad tie of claim 2, further comprising a capstock co-extruded on an exterior surface of the top wall and on exterior surfaces of the pair of spaced apart side walls, but not on an exterior surface of the bottom wall.

6. The extruded railroad tie of claim 5, further comprising a knurled surface formed on at least one of the exterior surface of the top wall, the exterior surfaces of the pair of spaced apart side walls, and an exterior surface of the bottom wall.

7. The extruded railroad tie of claim 5, further comprising a textured surface comprising debossed features formed on at least one of the exterior surface of the top wall, the exterior surfaces of the pair of spaced apart side walls, and an exterior surface of the bottom wall.

8. The extruded railroad tie of claim 5, further comprising a textured surface comprising embossments formed on at least one of the exterior surface of the top wall, the exterior surfaces of the pair of spaced apart side walls, and an exterior surface of the bottom wall.

9. The extruded railroad tie of claim 1, the plurality of threaded bolt holes being arranged for bolting on a rail plate.

10. The extruded railroad tie of claim 1, the plurality of parallel spaced apart interior walls including an intermediate wall disposed between the first interior wall and the second interior wall.

11. The extruded railroad tie of claim 10, the plurality of parallel spaced apart interior walls defining a plurality of interior compartments, the interior compartments receiving ballast.

12. The extruded railroad tie of claim 10, the plurality of parallel spaced apart interior walls defining a plurality of interior compartments, the interior compartments providing cooling passages.

13. The extruded railroad tie of claim 1, the plurality of threaded bolt holes extending into the first interior wall being aligned with the plurality of threaded bolt holes extending into the second interior wall.

14. The extruded railroad tie of claim 1, further comprising a rail plate attached to an exterior side of the top wall, the rail plate including a first side, a second side opposite the first side, a rail channel disposed between the first side and the second side, and a plurality of mounting holes formed in each of the first side and the second side, the plurality of mounting holes being aligned with the plurality of threaded bolt holes extending into each of the first interior wall and the second interior wall.

15. The extruded railroad tie of claim 14, further comprising a plurality of bolts extending through the mounting holes in the rail plate and into the threaded bolt holes.

16. The extruded railroad tie of claim 15, further comprising a plurality of rail mounting clamps, each mounting clamp including a first portion overlapping a portion of the rail channel, a second portion opposite the first portion, and a clamp mounting hole between the first portion and the second portion, and one of the bolts extending through each clamp mounting hole, through the mounting hole of the rail plate and into the threaded bolt hole.

17. An extruded railroad tie comprising a hollow rectangular prism including an interior space, a top wall, a bottom wall and a pair of spaced apart side walls, the hollow rectangular prism being comprised of extruded PVC with glass fiber reinforcement, the glass fiber reinforcement including separated glass fibers and clumps of pelletized glass fibers, at least some of the separated glass fibers and clumps of pelletized glass fibers being palpable at an exterior side of the bottom wall; a plurality of parallel spaced apart interior walls defining a plurality of interior compartments, at least some of the separated glass fibers and clumps of pelletized glass fibers being palpable at interior sides of the top wall, bottom wall and plurality of parallel spaced apart interior walls; a capstock co-extruded on an exterior surface of the top wall and on exterior surfaces of the pair of spaced apart side walls; the plurality of parallel spaced apart interior walls including a first interior wall and a second interior wall, a plurality of threaded bolt holes extending through the top wall into each of the first interior wall and the second interior wall.

18. The extruded railroad tie of claim 17, the plurality of threaded bolt holes extending into the first interior wall being aligned with the plurality of threaded bolt holes extending into the second interior wall.

19. The extruded railroad tie of claim 18, further comprising a rail plate attached to an exterior side of the top wall, the rail plate including a first side, a second side opposite the first side, a rail channel disposed between the first side and the second side, and a plurality of mounting holes formed in each of the first side and the second side, the plurality of mounting holes being aligned with the plurality of threaded bolt holes extending into each of the first interior wall and the second interior wall; and a plurality of bolts extending through the mounting holes in the rail plate and into the threaded bolt holes.

20. The extruded railroad tie of claim 19, further comprising a plurality of rail mounting clamps, each mounting clamp including a first portion overlapping a portion of the rail channel, a second portion opposite the first portion, and a clamp mounting hole between the first portion and the second portion, and one of the bolts extending through each clamp mounting hole, through the mounting hole of the rail plate and into the threaded bolt hole.

* * * * *